Patented Feb. 16, 1943

2,311,314

UNITED STATES PATENT OFFICE 2,311,314

PURIFICATION OF WATER

Joseph S. Reichert and Arthur A. Elston, Niagara Falls, N. Y., assignors to E. I. du Pont de Nemours & Company, Wilmington, Del., a corporation of Delaware No Drawing. Application September 20, 1940, Serial No. 357,617

11 Claims. (Cl. 210—23)

This invention relates to a new and improved method for the purification of water. More particularly, it is directed to an improved method for removing iron and manganese metallic impurities from water which is intended for industrial use.

Water which is to be utilized for industrial purposes frequently contains objectionable amounts of metallic impurities, particularly compounds of iron and manganese. Before such water can be utilized in various industrial processes it must be treated in order to remove or reduce the amount of these metallic impurities. Previously known methods for the purification of water have not been successful in securing the complete removal of iron and manganese impurities simultaneously by means of a single direct purification operation. Methods previously applied for the purification of water intended for industrial uses have required close chemical control and careful manipulation in order to prevent contamination of the water with soluble salts introduced thereinto as residues of the treating agents employed.

In the past it has been usual to utilize certain oxidizing agents for the purpose of oxidizing metallic impurities, particularly iron and manganese compounds, to a condition in which they can be precipitated and removed from the water. Among such oxidizing agents the various permanganates, such as those of potassium or calcium, hypochlorites, and chlorine, have been employed industrially to some extent. While such oxidizing agents will operate to oxidize the metallic impurities specified, they leave behind objectionable residues. Thus, the permanganates will ordinarily leave behind soluble manganese salts, while chlorine and the hypochlorites leave behind soluble chlorides. These residues cannot be removed by simple means, and for this reason the use of such oxidizing agents for the purification of water has been distinctly limited.

The use of oxidizing agents which do not leave behind objectionable residues, such as hydrogen peroxide, has also been suggested. Unfortunately hydrogen peroxide is ineffective in oxidizing manganese compounds and therefore cannot be utilized for removing this metal. In the past aeration of the water has been the most extensively used method for reducing the quantity of metallic impurities present therein, but even under the most effective conditions aeration will remove only from 80 to 90% of the iron and practically none of the manganese. Moreover, if organic materials are also present in the water, additional oxidizing agents must be employed either before or after the aeration step.

It is an object of this invention to develop a simple and direct method for the purification of water, more particularly water intended for industrial purposes, which method will operate to remove iron and manganese salts from the water under conditions wherein no objectionable residual material remains therein. Another object of this invention is to accomplish the oxidation of iron and manganese salts present in water and the removal of these metallic impurities therefrom under conditions wherein substantially all of the metallic impurities are precipitated by means of a simple, direct treatment with a single oxidizing agent. Still another object of our invention is to devise a method utilizing the powerful oxidizing agent monopersulfuric acid (Caro's acid) as the agent for the oxidation of metallic ions present in water to a higher valence state, so that these metallic impurities may be readily and completely removed by precipitation in the form of the metal oxides or hydroxides. Still further objects of this invention will be apparent from the ensuing disclosure of certain preferred embodiments thereof.

Monopersulfuric acid (Caro's acid) is a powerful oxidizing agent having the formula $H_2SO_5$. We have observed that it is capable of oxidizing ferrous and manganous salts to the corresponding higher valence metal salts, i. e. ferric and tetravalent manganese salts. In aqueous solutions having a pH of 5.0 or higher, ferric and tetravalent manganese salts are precipitated as hydrated ferric oxide and manganese dioxide, which compounds can then be removed by settling, decantation, or filtration. In order to remove the iron and manganese salts, present in the form of their lower valence compounds, it is necessary to oxidize them to compounds in which the metal is present in its higher valence form, as the metallic ions will remain in solution and can be only incompletely removed therefrom if precipitated in the form of lower valence compounds.

The oxidation of the metallic impurities by means of Caro's acid ($H_2SO_5$) leaves behind only sulfate ions in the water, and such ions can be readily removed by precipitation if their presence is objectionable. Moreover, since Caro's acid is such an active oxidizing agent, the oxidation of the iron and manganese compounds is rapid and complete. The method, moreover, does not require precise control of the amount of oxidizing agent used in order to avoid contaminating the water further with excess oxidizing agent (as in the case of the permanganates) since the residues of the monopersulfuric acid oxidizing agent are either non-contaminating or may be readily removed. Moreover, the strong oxidizing agent, Caro's acid, serves effectively to remove substantially completely both iron and manganese compounds simultaneously.

In carrying out our improved method of purifying water utilizing monopersulfurric acid as the oxidizing agent it is desirable, although not absolutely necessary, to know in advance the iron and manganese content of the water which is to be treated. Any simple method for determining the amount of iron and manganese present in the water may be utilized. We have, however, secured considerable success in estimating the iron and manganese content by the use of methods described in Scott's "Standard Methods of Chemical Analysis" (fourth edition), published by Van Nostrand Company. Methods for determining the quantity of iron present are given on pages 261 and 262 of volume I and on page 1423 of volume II of this standard textbook, while methods for the determination of the manganese content are found on page 305 of volume I and on page 1426 of volume II. From an analysis of the water it is possible to compute the total quantity of ferrous iron and manganese in the water to be treated, which amount it is desired to oxidize and remove therefrom.

After estimating the quantity of iron and manganese present in the water, the total amount of monopersulfuric acid required may then be readily calculated by multiplying the amount of iron present by 1.11 and that of manganese present by 2.24 and taking the sum of the two products. In order to insure sufficient of the oxidizing agent, we prefer to increase the amount of monopersulfuric acid required, as determined in this way, by about 10% in order to provide for any amount of the monopersulfuric acid which may be lost by oxidizing organic material present or through decomposition. For example, if the water contains five parts per million of manganese and ten parts per million of iron, it is evident that 100,000 gallons of the water will contain 4.17 pounds of manganese and 8.35 pounds of iron. The quantity of monopersulfuric acid required for treating 100,000 gallons will therefore be 4.17×2.24 plus 8.35×1.11, or 18.61 pounds. Allowing for a 10% excess, it is desirable to use 20.5 pounds of the oxidizing agent.

The monopersulfuric acid required for oxidizing the metallic impurities present in the water may be prepared by any suitable known method. As we prefer that the solution of monopersulfuric acid utilized shall contain no substances other than the peracid, sulfuric acid, hydrogen peroxide, and water, it is ordinarily preferable to prepare the oxidizing agent by reacting hydrogen peroxide with concentrated sulfuric acid, or by the electrolysis of sulfuric acid solutions. A method for preparing monopersulfuric acid by reacting hydrogen peroxide with concentrated sulfuric acid, oleum, or sulfur dioxide, is described by Von Bayer and Villiger in the Berichte der deutschen Chemischen Gesellschaft, volume 33 (1900), page 2488. In order to prepare the amount of monopersulfuric acid required for treating 100,000 gallons of water containing five parts per million of manganese and ten parts per million of iron, as calculated above, it is possible, following the method of Von Bayer and Villiger, to react 90 pounds of 30% oleum (fuming sulfuric acid) with 22.5 pounds of a solution of hydrogen peroxide of 100 volume concentration (27.6% $H_2O_2$ by weight). The reaction should be carried out with provision for adequate cooling. In the resulting solution approximately 90% of the hydrogen peroxide utilized will be converted to the peracid. Methods of analyzing the monopersulfuric acid content of solutions containing that oxidizing agent are described in the textbook by Oesper, "Newer Methods of Volmetric Analysis," page 109.

The water which is to be treated may be placed in a wooden or non-metallic tank equipped with an agitator which is capable of thoroughly and rapidly mixing the water and oxidizing agent. While agitating the water the required amount of monopersulfuric acid solution is added as rapidly as possible and mixing is continued thereafter for five minutes or longer. Then, while still agitating the water, there is added thereto a sufficient quantity of an alkaline agent to adjust the pH to 5.0 or above. The use of alkalizing agents such as oxides, hydroxides, and carbonates of calcium and barium, which yield insoluble salts with the residual sulfuric acid, is to be preferred. Because of its cheapness and ready availability we ordinarily prefer to use as the alkalizing agent lime or limestone. However, other alkalizing agents such as caustic soda, soda ash, and the oxide and hydroxide of magnesium may be utilized if the soluble residues in the water resulting from their use are not objectionable. We have found that it is essential to adjust the pH of the treated water to a value not lower than somewhere in the range 5.0 to 5.2 in order that the oxides and hydroxides of iron and manganese may be precipitated in the form of their higher valence compounds.

Our process is capable of considerable variation from the preferred procedure described. Thus, while it is desirable to know the amount of iron and manganese which is to be removed from the water, this is not absolutely necessary, as a large excess of the monopersulfuric acid solution may be utilized without harmful effects. The excess peracid decomposes eventually into sulfuric acid and molecular oxygen, thus leaving behind no objectionable residues in the treated water. However, for economical reasons it is usually desirable to provide but a slight excess of peracid over that actually required to oxidize the amount of metallic impurities present. While it is desirable to keep the excess of peracid relatively small, this excess may of course vary over considerable limits, depending on the amount of other substances which may be oxidized by treatment with monopersulfuric acid, such for example as organic materials, present in the water.

Under some circumstances we may utilize an amount of the peracid less than that theoretically necessary to oxidize all of the oxidizable impurities present. This will normally result in incomplete removal of either the iron or the manganese or both. Of course, for many purposes it may not be necessary or even desirable to remove all of the iron and manganese present, and when such is the case our improved process can be carried out simply by utilizing less than the theoretical quantity of monopersulfuric acid required.

Our process may be very advantageously applied to the continuous purification of water, since the presence of an excess of the peracid oxidizing agent is not objectionable. In continuous methods a continuous stream of the peracid solution may be continuously mixed with a stream of water, the rates of flow of the two streams being maintained in accordance with the concentration of impurities present in the water. This regulation may be accomplished by means of any suitable proportioning device. After adding the peracid to the stream of water the alkali or alkalis necessary to adjust the pH of the water to 5.0 or higher may be similarly added in a continuous manner. The precipitates as formed may be removed by continuous filtration, or they may be allowed to settle out in suitable tanks or reservoirs.

It is also possible to treat the water with the monopersulfuric acid oxidizing agent in order to accomplish the removal of iron and manganese therefrom in two or more stages, part of the impurities being removed at the conclusion of each stage. When utilizing such a multi-stage process the peracid may be employed alone in all steps, or in one or more steps and other oxidizing agents may be utilized in other steps. For example, in the first step of a two-stage process air, hydrogen peroxide or sodium peroxide may be employed to oxidize the greater part of the iron present, this step being followed by a second step wherein monopersulfuric acid is added in order to complete the oxidation of the iron and manganese impurities.

Moreover, while we prefer to utilize solutions of monopersulfuric acid which contain no substances other than the peracid itself, sulfuric acid, and hydrogen peroxide, solutions of peracids prepared by methods which result in the presence of other substances may also be employed, provided the residues remaining after the oxidation are not objectionable for the purpose for which the water is intended. For example, in such cases monopersulfuric acid may be prepared by treating persulfates with concentrated sulfuric acid, or by reacting chlorosulfuric acid and hydrogen peroxide. While the use of monopersulfuric acid prepared by such reactions will leave behind residual materials in the water treated, such residues may not be objectionable in the industrial application to which the purified water is to be put.

Under some circumstances the settling and separation of the precipitate, particularly if the quantity of iron and manganese is low, may be relatively slow. Under such circumstances the separation of the precipitates may be hastened by flocculation or by the employment of practices frequently used for water purification such as the addition of aluminum sulfate, various alums, or ferric salts.

As an example of our new and improved method for the purification of water to remove iron and manganese impurities therefrom, the following may be given:

*Example*

This example involved the purification of one litre of water containing five parts per million of manganese and ten parts per million of ferrous iron compounds. The pH of the water was 5.6. Into this litre of water there was stirred by means of a motor-driven agitator 12.3 cubic centimeters of a solution of monopersulfuric acid containing substantially 0.184 gram of $H_2SO_5$ per 100 cc. of solution. This amount of peracid solution represents approximately a 10% excess over that theoretically required to oxidize the iron and manganese present in the litre of water.

This solution of peracid was prepared by reacting 44 grams of a 30% solution of oleum with 111 grams of a commercial 100 volume solution of hydrogen peroxide (27.6% $H_2O_2$ by weight), the reaction being carried out with suitable provision for cooling. The resulting solution was diluted to 5 litres by the addition of pure water.

After all the solution of monopersulfuric acid had been added, stirring was continued for approximately five minutes. Sufficient calcium carbonate was then added to the water to adjust the pH to 5.6. A precipitate formed and was allowed to coagulate and settle. The precipitate was then removed by decanting the water and filtering it through a filter. This gave a clear filtrate which was substantially completely free of iron and manganese impurities. Colorimetric tests on this purified water in order to determine residual iron and manganese therein indicated that the water was free from any detectable amount of these metallic impurities. These tests were carried out by treating samples of the purified water with sodium thiocyanate for iron determination and with a mixture of ammonium persulfate and silver nitrate for manganese determination. No characteristic colors were obtained in either case, thus indicating substantial freedom from iron and manganese.

It is evident that our improved method for removing iron and manganese impurities from water intended for use in industrial processes has considerable utility and may be used for a wide variety of purposes. For example, in the processing of textile materials, such as in bleaching and dyeing operations, iron and manganese dissolved impurities are generally objectionable. It is well understood in the industrial utilization of bleach baths comprising peroxygen compounds, such as hydrogen peroxide, that iron and manganese compounds present therein adversely affect the stability of the bath. Our process provides a simple and direct method for removing these impurities and thus enhancing the stability of such bleach baths. This process is equally applicable for the treatment of water intended for use in processing edible and pharmaceutical products and for the production of various materials for industrial purposes where satisfactory color and high stability of the product are essential. Our method, while serving to remove these metallic impurities by a direct method requiring no special equipment or manipulation, does not introduce into the water being treated any objectionable residue.

It is apparent that various changes may be made in the procedure described as illustrative of our preferred process which would nevertheless come within the purview of our invention. Accordingly, its scope is not to be restricted to details and procedure given herein as illustrative of the preferred embodiment, but is to be construed in accordance with the prior art and appended claims.

We claim:

1. The method of purifying water in order to free it from metallic impurities dissolved therein which comprises adding monopersulfuric acid to said water in amount sufficient to oxidize metallic impurities present therein as metallic compounds of lower valence to metallic compounds of higher valence, adding an alkaline agent to the resulting solution in order to adjust the pH to a value at which said metallic impurities are precipitated in the form of insoluble metallic compounds, and removing said precipitated metallic impurities.

2. The method of purifying water to free it from dissolved iron and manganese compounds present therein which comprises adding to said water monopersulfuric acid in amount sufficient to oxidize said iron and manganese compounds present therein in the form of metallic compounds of lower valence to metallic compounds wherein said metals exhibit higher valences, adding an alkaline agent in amount sufficient to adjust the pH of the resulting solution to one at which said iron and manganese compounds will be precipitated in the form of insoluble metallic compounds, and then removing said precipitated iron and manganese compounds from said purified water.

3. The method of purifying water intended for industrial purposes to free it from iron and manganese impurities present therein which comprises adding thereto monopersulfuric acid in amount sufficient to oxidize said iron and manganese impurities present therein in the form of metallic compounds of lower valences to metallic compounds in which said metals exhibit higher valences, adding an alkaline agent in amount sufficient to adjust the pH of the resulting liquid to at least 5.0 in order to insure precipitation of said iron and manganese impurities, and then removing said precipitated metallic compounds from said purified liquid.

4. The method of purifying water to free it from dissolved iron and manganese impurities present therein which comprises adding monopersulfuric acid to said water in amount sufficient to oxidize metallic impurities present therein in the form of metallic compounds of metals exhibiting a lower valence to metallic compounds of metals exhibiting a higher valence, adding to the resulting solution an alkaline agent in amount sufficient to adjust the pH thereof to at least 5.0, thereby precipitating said metallic impurities in the form of insoluble metallic compounds, and removing said precipitated iron and manganese compounds from said purified water.

5. The method of purifying water in order to free it from dissolved iron and manganese compounds contained therein which comprises adding monopersulfuric acid to said water in amount sufficient to oxidize said metallic impurities present therein in which the metals exhibit lower valences to metal compounds in which said metals exhibit higher valences, adding to the resulting solution an alkaline calcium compound in amount sufficient to adjust the pH to at least 5.0, thereby precipitating said metallic impurities in the form of insoluble compounds, and removing said precipitated metallic impurities from said purified liquid.

6. The method of purifying water in order to free it from dissolved iron and manganese compounds contained therein which comprises adding monopersulfuric acid to said water in amount sufficient to oxidize metallic impurities present therein wherein the metals exhibit lower valences to metallic compounds in which said metals exhibit higher valences, adding to the resulting solution an alkaline barium compound in amount sufficient to adjust the pH to at least 5.0, thereby precipitating said metallic impurities in the form of insoluble compounds, and removing said precipitated metallic impurities from said purified liquid.

7. The method of purifying water in order to free it from dissolved iron and manganese compounds contained therein which comprises adding monopersulfuric acid to said water in amount sufficient to oxidize metallic impurities present therein wherein the iron and manganese exhibit lower valences to metallic compounds in which said iron and manganese metals exhibit higher valences, adding to the resulting solution calcium carbonate in amount sufficient to adjust the pH to at least 5.0, thereby precipitating said metallic impurities in the form of insoluble compounds, and removing said precipitated metallic impurities from said purified liquid.

8. The method of purifying water to free it from dissolved iron and manganese compounds contained therein which comprises oxidizing iron compounds wherein the iron is in the ferrous state to compounds wherein the iron is in the ferric state by the addition of a suitable oxidizing agent thereto, adding monopersulfuric acid in amount sufficient to oxidize manganese impurities present therein wherein the manganese is in the manganous state to compounds wherein the manganese is in the tetravalent state, adding an alkaline agent in amount sufficient to adjust the pH of the resulting solution to one at which precipitation of said metallic impurities will occur, and removing said precipitated iron and manganese impurities from said purified liquid.

9. The method of purifying water intended for industrial purposes to free it from iron and manganese impurities present therein which comprises; oxidizing iron impurities present therein in which the iron is in the ferrous state to compounds in which the iron is in the ferric state by aerating said water; oxidizing manganese impurities present therein in which the manganese is present in the manganous state to compounds in which the manganese is in the tetravalent state by the addition of monopersulfuric acid thereto; adding an alkaline agent to said solution in amount sufficient to adjust the pH to at least 5.0, thereby precipitating iron and manganese impurities in the form of insoluble compounds; and removing said precipitated metallic compounds from said purified liquid.

10. The method of purifying water to free it from dissolved iron and manganese compounds contained therein which comprises; oxidizing iron compounds present therein wherein the iron is in the ferrous state to compounds wherein the iron is in the ferric state by adding hydrogen peroxide thereto; adding monopersulfuric acid in amount sufficient to oxidize manganese compounds present therein wherein the manganese is in the manganous state to compounds wherein the manganese is in the tetravalent state; adding an alkaline agent to the resulting solution in amount sufficient to adjust the pH to one at which said iron and manganese compounds present therein will precipitate; and then removing said precipitated iron and manganese compounds from said purified water.

11. The method of purifying water to free it from dissolved iron and manganese compounds contained therein which comprises; oxidizing iron compounds present therein in which the iron is in the ferrous state to compounds in which the iron is in the ferric state by adding sodium peroxide thereto; adding monopersulfuric acid in amount sufficient to oxidize manganese compounds present therein in which the manganese is in the manganous state to compounds in which said manganese is in the tetravalent state; adding an alkaline agent to the resulting solution in amount sufficient to adjust its pH to one at which said iron and manganese impurities will precipitate therein; and then removing said precipitated iron and manganese compounds from said purified water.

JOSEPH S. REICHERT.
ARTHUR A. ELSTON.